United States Patent
Ozawa et al.

(10) Patent No.: US 8,991,641 B2
(45) Date of Patent: Mar. 31, 2015

(54) PRESSURE VESSEL AND METHOD OF MANUFACTURING THE SAME

(75) Inventors: Tetsuya Ozawa, Minatu-ku (JP); Nozomu Kawasetsu, Minato-ku (JP); Kentaro Shindo, Minato-ku (JP); Mitsuru Kondo, Minato-ku (JP); Akira Fukushima, Minato-ku (JP); Masayasu Ishibashi, Osaka (JP); Takeshi Tanamura, Osaki (JP); Kazuo Nakajima, Osaka (JP); Hiroshi Sakai, Osaka (JP); Tetsuro Hirokawa, Osaka (JP)

(73) Assignees: Mitsubishi Heavy Industries, Ltd., Tokyo (JP); Shikibo Ltd., Osaka (JP)

( * ) Notice: Subject to any disclaimer, the term of this patent is extended or adjusted under 35 U.S.C. 154(b) by 882 days.

(21) Appl. No.: 13/087,495

(22) Filed: Apr. 15, 2011

(65) Prior Publication Data

US 2012/0024866 A1   Feb. 2, 2012

(30) Foreign Application Priority Data

Jul. 30, 2010   (JP) ................. 2010-172453

(51) Int. Cl.
| | |
|---|---|
| *F17C 1/06* | (2006.01) |
| *B29C 70/08* | (2006.01) |
| *B29C 53/58* | (2006.01) |
| *B29C 70/32* | (2006.01) |
| *B29L 31/00* | (2006.01) |

(52) U.S. Cl.
CPC ............. *B29C 70/088* (2013.01); *B29C 53/588* (2013.01); *B29C 70/32* (2013.01); *B29L 2031/7156* (2013.01); *F17C 1/06* (2013.01)
USPC ............................ 220/590; 220/566; 220/592

(58) Field of Classification Search
CPC .... B29C 70/32; F17C 1/06; B29L 2031/7156
USPC ......... 220/588, 589, 592, 566, 590, 581, 586; 428/34.1; 156/60
See application file for complete search history.

(56) References Cited

U.S. PATENT DOCUMENTS 4,366,658 A * 1/1983 Maistre ....................... 428/34.1
4,475,662 A   10/1984 Mandel
(Continued)

FOREIGN PATENT DOCUMENTS

| | | |
|---|---|---|
| EP | 0 172 098 | 2/1986 |
| GB | 2 110 566 | 6/1983 |
| JP | 11-512804 | 11/1999 |

(Continued)

OTHER PUBLICATIONS

Extended European Search Report issued Nov. 30, 2011 in corresponding European Application No. 11401557.1.

*Primary Examiner* — Robert J Hicks
*Assistant Examiner* — Kareen Rush
(74) *Attorney, Agent, or Firm* — Wenderoth, Lind & Ponack, L.L.P.

(57) ABSTRACT

A toroidal pressure vessel having extremely high pressure resistance has laminated latitudinal reinforcing fiber layers to improve a strength in a latitudinal direction of the pressure vessel. Moreover, putting reinforcing fibers constituting those laminated latitudinal reinforcing fiber layers in continuity enables further improvement of strength in the latitudinal direction of the pressure vessel, for example compared with a case where the reinforcing fibers are divided for each layer.

2 Claims, 6 Drawing Sheets

(56) References Cited

U.S. PATENT DOCUMENTS

| | | | | |
|---|---|---|---|---|
| 4,582,211 A | * | 4/1986 | Mandel | 220/589 |
| 5,173,358 A | * | 12/1992 | Anahara et al. | 442/206 |
| 6,357,439 B1 | | 3/2002 | Cook et al. | |
| 7,086,553 B2 | * | 8/2006 | Debecker et al. | 220/589 |
| 8,444,900 B2 | * | 5/2013 | Wilson et al. | 264/258 |

FOREIGN PATENT DOCUMENTS

| | | |
|---|---|---|
| WO | 97/12175 | 3/1997 |
| WO | 2006/076384 | 7/2006 |

* cited by examiner

PRESSURE VESSEL AND METHOD OF MANUFACTURING THE SAME

TECHNICAL FIELD

The present invention relates to a toroidal pressure vessel formed of an annular-shaped hollow tube and a method of manufacturing the toroidal pressure vessel.

BACKGROUND ART

A pressure vessel is used as a fuel tank for storing a fuel gas for an automobile or the like (for example, compressed natural gas: CNG) at high pressure. In recent years, from a viewpoint of environmental protection and needs of users, there has been an increasing demand for reducing fuel consumption of automobiles or the like. Accordingly, a smaller and lighter fuel tank equipped in an automobile or the like has been strongly desired. A toroidal pressure vessel has higher pressure resistance and is capable of storing gas at higher pressure compared with a cylindrical pressure vessel, for example, and hence it is possible to reduce the size of the pressure vessel while maintaining the gas storage capacity.

For example, in the pressure vessel of Patent Literature 1, the pressure resistance is enhanced by arranging meridional reinforcing fibers and latitudinal reinforcing fibers on the surface of the toroidal inner vessel. Specifically, the meridional reinforcing fibers are used for restricting expansion of the pressure vessel in the meridional cross-section of the toroidal, and the latitudinal reinforcing fibers are used for restricting expansion of the pressure vessel in the latitudinal cross-section of the toroidal, thereby improving the pressure resistance. Note that, the meridional direction is a direction of a plane which includes an axis (indicated by C of FIG. 1) of the toroidal shape (direction indicated by M of FIG. 1), and the latitudinal direction is a direction of a plane orthogonal to the central axis (direction indicated by L of FIG. 1).

CITATION LIST

Patent Literature 1: Japanese Patent Translation Publication No. Hei 11-512804

SUMMARY OF INVENTION

Technical Problem

There has been an increasing demand for improving the pressure resistance of the pressure vessel, and extremely high pressure resistance, for example under pressures of 1,000 atmospheres or higher, is sometimes demanded. In order to achieve such extremely high pressure resistance, it may not enough to arrange the reinforcing fibers in the meridional direction and in the latitudinal direction as described in Patent Literature 1, and therefore further idea is required.

An object to be achieved by the present invention is to provide a toroidal pressure vessel having extremely high pressure resistance.

Solution to Problem

In order to achieve the above-mentioned object, the present invention provides a pressure vessel which includes: a toroidal inner vessel formed of an annular-shaped hollow tube; meridional reinforcing fiber layers formed of reinforcing fibers wound around an outer peripheral surface of the inner vessel along a meridional direction; and latitudinal reinforcing fiber layers formed of reinforcing fibers wound around the outer peripheral surface of the inner vessel along a latitudinal direction, in which the latitudinal reinforcing fiber layers are laminated in a plurality of layers around the outer peripheral surface of the inner vessel, and the reinforcing fibers constituting each of the plurality of layers thus laminated are continuous from one layer to a next layer.

In this way, laminating the latitudinal reinforcing fiber layers in the plurality of layers enables to improve a strength in the latitudinal direction of the pressure vessel. Moreover, putting the reinforcing fibers constituting those laminated latitudinal reinforcing fiber layers in continuity enables to further improve the strength in the latitudinal direction of the pressure vessel, for example compared with a case where the reinforcing fibers are divided for each layer.

The latitudinal reinforcing fiber layers and the meridional reinforcing fiber layers can be alternately laminated, for example.

If the latitudinal cross-section and the meridional cross-section of the inner vessel are circular, no stress concentration is formed in the inner vessel, and therefore it is possible to further improve the pressure resistance of the pressure vessel.

If the reinforcing fibers constituting the latitudinal reinforcing fiber layer are arranged on the surface of the inner vessel with no space between the reinforcing fibers, it is possible to further improve the pressure resistance.

Here, when the meridional reinforcing fibers and the latitudinal reinforcing fibers are arranged around the outer peripheral surface of the inner vessel, as illustrated in FIG. 6 for example, meridional reinforcing fibers 31a can be relatively easily fixed to an inner vessel 2 by winding the meridional reinforcing fibers 31a around the outer peripheral surface of the inner vessel 2 in the meridional direction, but latitudinal reinforcing fibers 32a cannot be fixed to the inner vessel 2 merely by winding the latitudinal reinforcing fibers 32a around the inner vessel 2 in the latitudinal direction. Therefore, it is necessary to take a measure to, for example, arrange and wind the reinforcing fibers in the latitudinal direction while hardening with a resin. In this case, the necessity of winding the latitudinal reinforcing fibers while taking time for the resin to harden leads to very poor productivity.

With this in mind, if the reinforcing fibers are arranged on the outer peripheral surface of the inner vessel along the latitudinal direction, while another reinforcing fibers are wound around an outer periphery of the inner vessel and over the latitudinal reinforcing fibers along the meridional direction, it is possible to easily fix the latitudinal reinforcing fiber layers to the inner vessel, and productivity is significantly improved.

Further, in this manufacturing method, if the meridional reinforcing fibers are helically advanced in the latitudinal direction while being wound in the meridional direction, thereby alternately laminating the latitudinal reinforcing fiber layers and the meridional reinforcing fiber layers, it is possible to continuously wind and laminate the latitudinal reinforcing fibers in a seamless way. The pressure vessel thus manufactured has the latitudinal reinforcing fiber layer and the meridional reinforcing fiber layer alternately laminated thereon.

Advantageous Effects of Invention

As described above, according to the present invention, a toroidal pressure vessel having extremely high pressure resistance can be achieved.

DESCRIPTION OF EMBODIMENTS

An embodiment of the present invention is described hereinafter based on the drawings.

Figure 1:
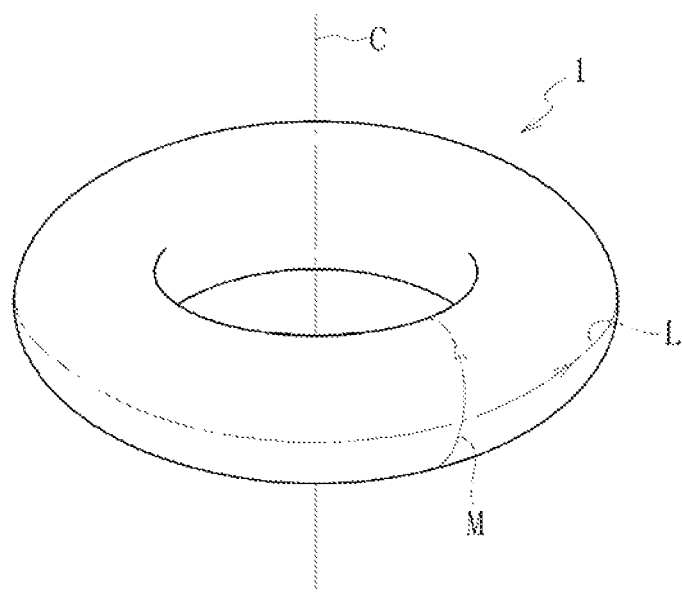
FIG. 1 illustrates a perspective view of a pressure vessel.
Figure 2:
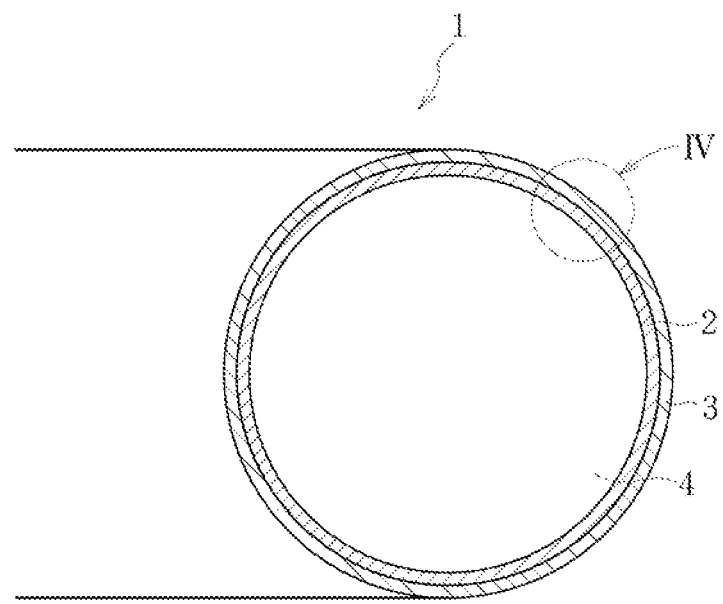
FIG. 2 illustrates a cross-sectional view of the pressure vessel in a meridional direction.

As illustrated in FIG. 1, a pressure vessel 1 according to this embodiment has a toroidal shape formed of an annular-shaped hollow tube. An axis of the toroidal shape is indicated by C, a meridional direction is indicated by M, and a latitudinal direction is indicated by L. As illustrated in FIG. 2 (cross-section in the meridional direction M) and FIG. 3 (cross-section in the latitudinal direction L), the pressure vessel 1 includes a toroidal inner vessel 2 and a composite material layer 3 provided on a surface of the inner vessel 2. The pressure vessel 1 is adapted for storing high-pressure gas in an internal space 4 of the inner vessel 2, and for example, used as a fuel tank for storing a fuel gas for an automobile or the like (for example, CNG). Note that, an inlet/outlet port for the high-pressure gas is omitted in FIG. 1.

Figure 3:
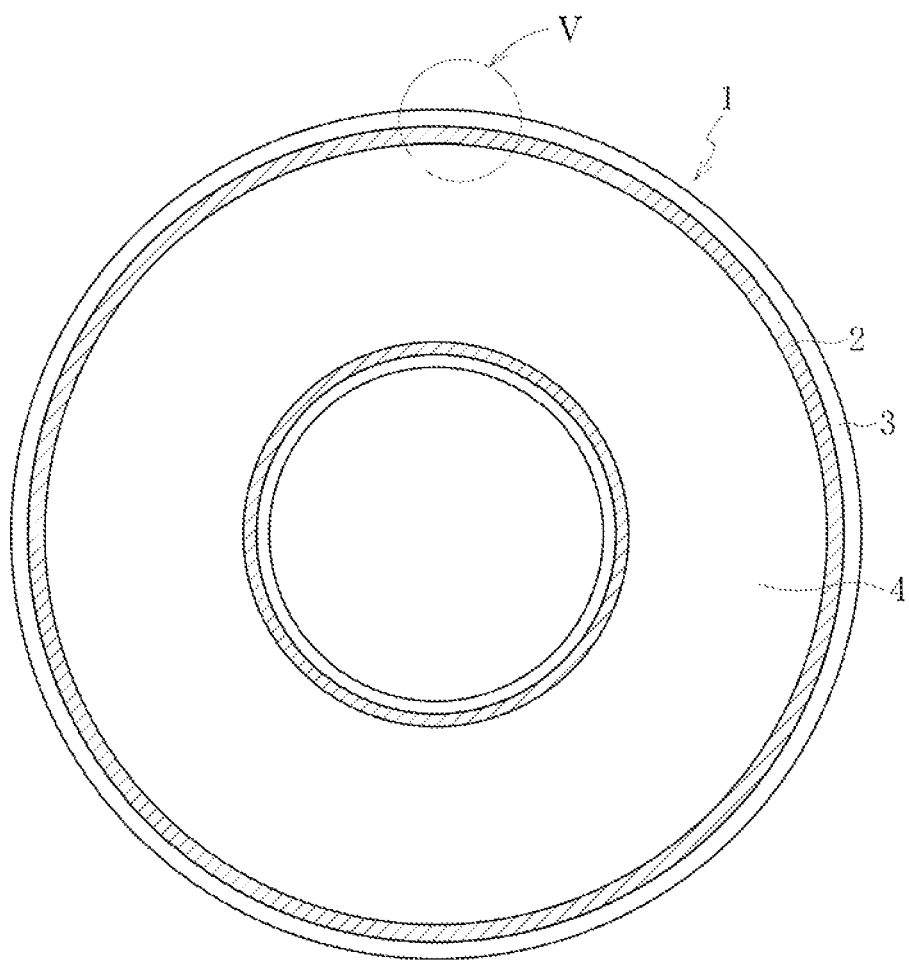
FIG. 3 illustrates a cross-sectional view of the pressure vessel in a latitudinal direction.

The inner vessel 2 has a toroidal shape and is made of metal, for example. As illustrated in FIG. 2 and FIG. 3, the inner vessel 2 has a circular shape in both cross-sections in the meridional direction M and in the latitudinal direction L.

Figure 4:
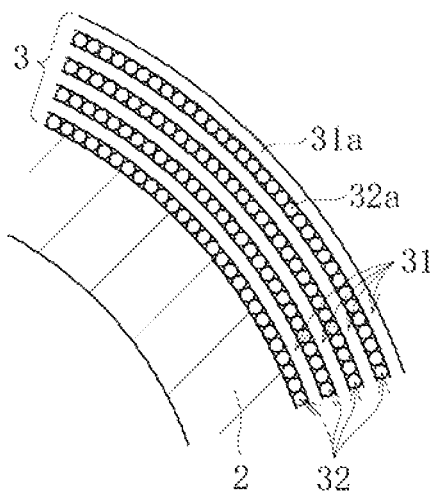
FIG. 4 illustrates an enlarged view of the portion indicated by IV of FIG. 2.
Figure 5:
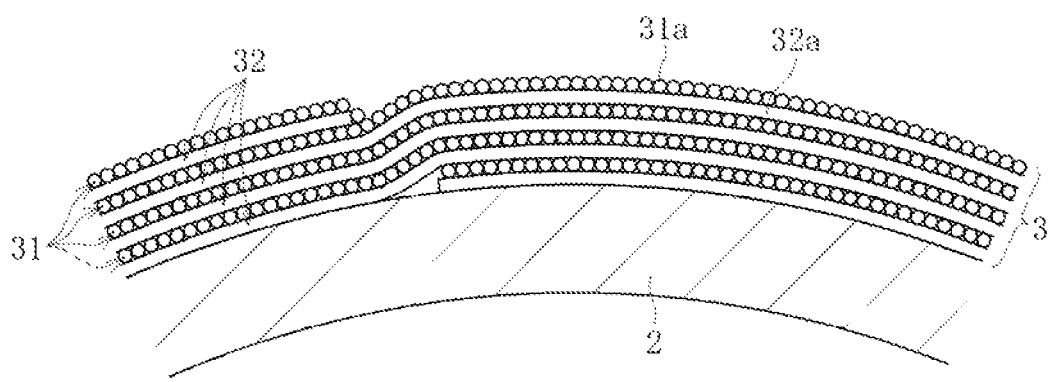
FIG. 5 illustrates an enlarged view of the portion indicated by V (lamination starting point of a latitudinal reinforcing fiber layer) of FIG. 3.

The composite material layer 3 is made by impregnating the reinforcing fiber layers with a resin to be hardened. The reinforcing fiber layers are made of carbon fibers, for example. The resin to be used for impregnating into the reinforcing fiber layers may include, for example, a thermosetting resin and a thermoplastic resin. Specifically, an epoxy resin, bismaleimide, and polyimide, and the like are usable as the thermosetting resin, and polyetheretherketon and the like are usable as the thermoplastic resin. As illustrated in FIG. 4 and FIG. 5, the reinforcing fiber layers include meridional reinforcing fiber layers 31 which are formed of reinforcing fibers 31a wound around an outer periphery of the inner vessel 2 in the meridional direction, and latitudinal reinforcing fiber layers 32 which are formed of reinforcing fibers 32a wound around the outer periphery of the inner vessel 2 along the latitudinal direction. The meridional reinforcing fiber layers 31 and the latitudinal reinforcing fiber layers 32 are alternately laminated on an outer peripheral surface of the inner vessel 2. The resin is impregnated into those reinforcing fiber layers 31, 32 and cured to form the composite material layer 3.

Figure 6:
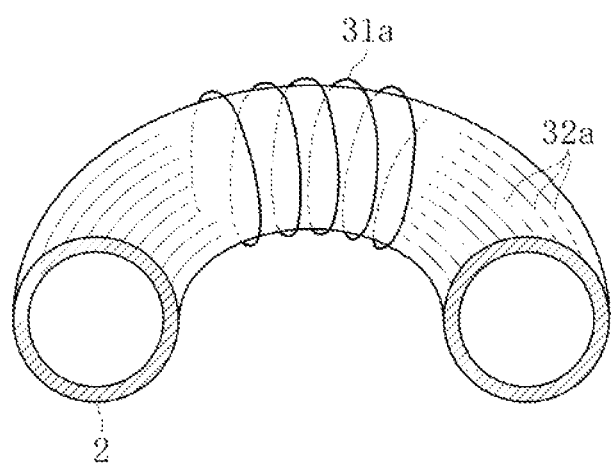
FIG. 6 illustrates a cross-sectional perspective view of the pressure vessel.

As illustrated in FIG. 6, the reinforcing fibers 31a constituting the meridional reinforcing fiber layers 31 are continuously arranged around the outer periphery of the inner vessel 2 in a seamless way. In this way, reinforcing the pressure vessel 1 by the meridional reinforcing fiber layers 31 allows expansion of the pressure vessel 1 in the meridional direction to be restricted and pressure resistance in the meridional direction to be improved. Note that, although in FIG. 6 the meridional reinforcing fibers 31a are spaced apart from one another in the latitudinal direction for ease of understanding, in fact the reinforcing fibers 31a are arranged with no space therebetween as illustrated in FIG. 5.

There are a plurality of laminated latitudinal reinforcing fiber layers 32. In this way, reinforcing the pressure vessel 1 by the latitudinal reinforcing fibers 32 allows expansion of the pressure vessel 1 in the latitudinal direction to be restricted and pressure resistance in the latitudinal direction to be improved. In particular, laminating the plurality of reinforcing fiber layers 32 enables to further improve pressure resistance in the latitudinal direction. As illustrated in FIG. 6, the reinforcing fibers 32a constituting the latitudinal reinforcing fiber layers 32 include a plurality of reinforcing fibers aligned with each other in the latitudinal direction. Those reinforcing fibers 32a are not divided for each layer to be laminated, but are arranged continuously from one layer to the next layer. Specifically, as illustrated in FIG. 5, the reinforcing fibers 32a are laminated by continuously winding the reinforcing fibers 32a around the inner vessel 2. Note that, although in FIG. 6 the plurality of latitudinal reinforcing fibers 32a are spaced apart from one another in the meridional direction for ease of understanding, in fact the reinforcing fibers 32a are arranged with no space therebetween as illustrated in FIG. 4.

Next, there is described a method of manufacturing the pressure vessel 1, particularly, a method of arranging the meridional reinforcing fiber layers 31 and the latitudinal reinforcing fiber layers 32 on the surface of the toroidal inner vessel 2.

Figure 7:
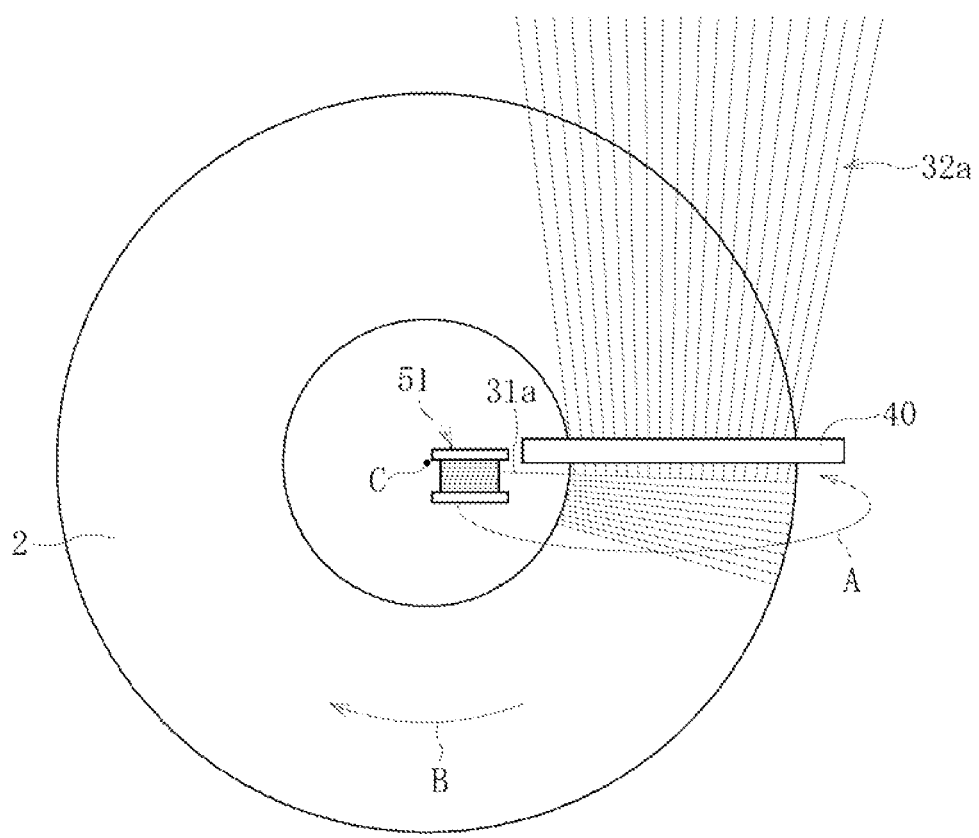
FIG. 7 illustrates a schematic plan view illustrating a method of manufacturing the pressure vessel.

First, as illustrated in FIG. 7, the plurality of latitudinal reinforcing fibers 32a supplied from a supply apparatus (not shown) are aligned with each other on the entire outer peripheral surface of the inner vessel 2 with no space between the reinforcing fibers. Specifically, the plurality of latitudinal reinforcing fibers 32a are supplied to the outer peripheral surface of the inner vessel 2, while being guided by a guide 40 so as to uniformly align with each other in the meridional direction.

Figure 8:
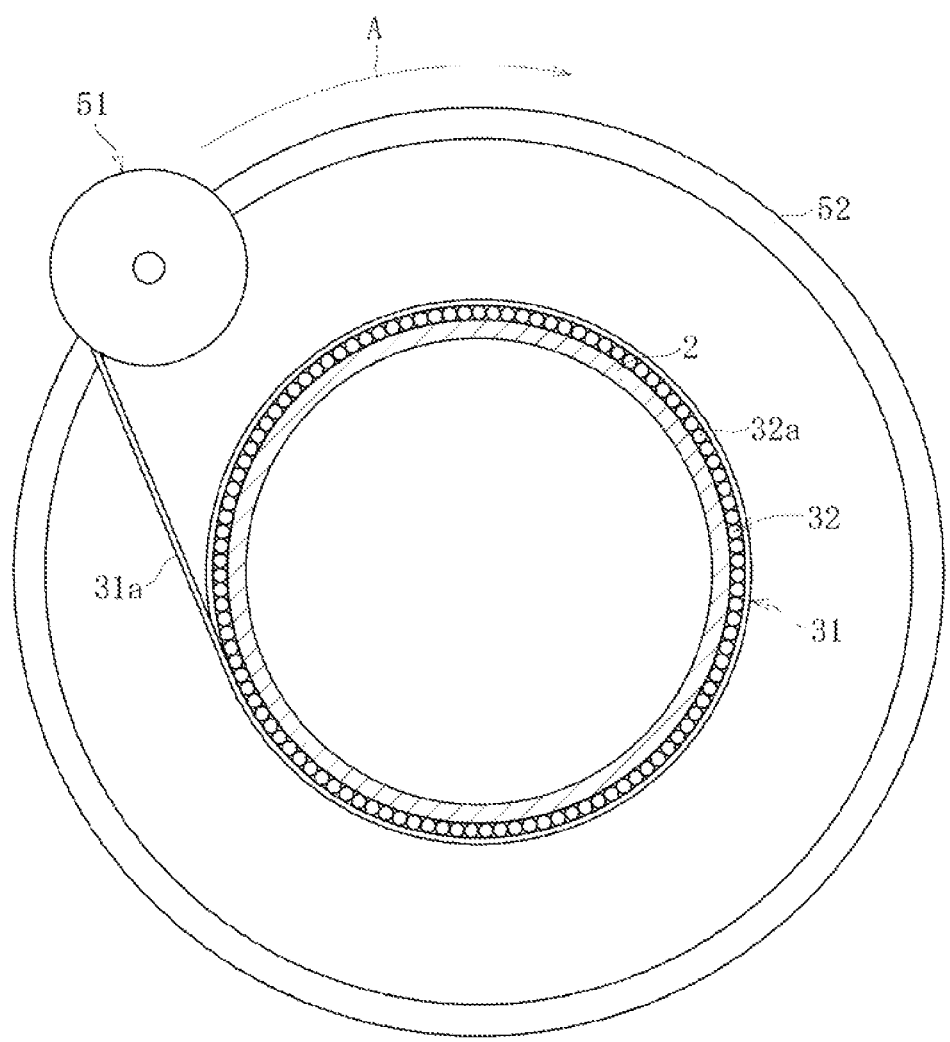
FIG. 8 illustrates a schematic cross-sectional view illustrating the method of manufacturing the pressure vessel in the meridional direction.
Figure 9:
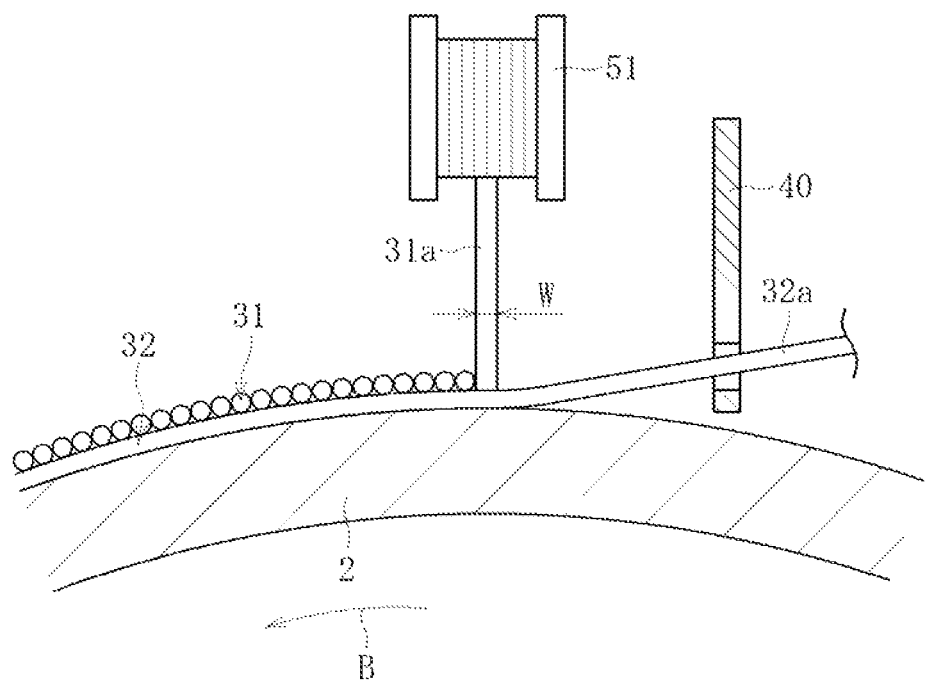
FIG. 9 illustrates a schematic cross-sectional view on magnified scale illustrating the method of manufacturing the pressure vessel in the latitudinal direction.

At the same time, the meridional reinforcing fibers 31a are wound around a part of the outer periphery of the inner vessel 2 that has the latitudinal reinforcing fibers 32a arranged. As illustrated in FIG. 8, winding of the meridional reinforcing fibers 31a is performed by a supply apparatus 51 for supplying the meridional reinforcing fibers 31a revolving along an annular rail 52 provided around the outer periphery of the inner vessel 2 (refer to an arrow A of FIG. 7 and FIG. 8). In this way, by winding the meridional reinforcing fibers 31a around the outer periphery of the inner vessel 2 and over the latitudinal reinforcing fibers 32a, as illustrated in FIG. 9, the latitudinal reinforcing fibers 32a are fixed to the surface of the inner vessel 2. Note that, the meridional reinforcing fibers 31 may be supplied from the supply apparatus 51 one by one, or some of the meridional reinforcing fibers 31 may be brought together and supplied from the supply apparatus 51.

At the same time as the revolution of the supply apparatus 51 as described above, the inner vessel 2 is rotated about the axis C in an arrow B direction (refer to FIG. 7 and FIG. 9), and, correspondingly, the meridional reinforcing fibers 31a are helically advanced in the latitudinal direction while being wound around the outer periphery of the inner vessel 2 in the meridional direction. As a result, the latitudinal reinforcing fibers 32a are sequentially fixed to the outer peripheral surface of the inner vessel 2 by the meridional reinforcing fibers 31a while being supplied around the outer peripheral surface of the inner vessel 2. Specifically, the inner vessel 2 is rotated about the axis C by a width W in the latitudinal direction (refer to FIG. 9) of the meridional reinforcing fibers 31a during one revolution of the supply apparatus 51 around the outer periphery of the inner vessel along the annular rail 52, thereby winding the meridional reinforcing fibers 31a on the inner vessel 2 with no space between the reinforcing fibers. Thus, the latitudinal reinforcing fiber layers 32 and the meridional reinforcing fiber layers 31 are sequentially formed as the inner vessel 2 is rotated about the axis C.

After one rotation of the inner vessel 2 about the axis C, the latitudinal reinforcing fiber layer 32 and the meridional reinforcing fiber layer 31 in the second round are overlaid on the outer periphery of the previously fixed latitudinal reinforcing fiber layer 32 and the meridional reinforcing fiber layer 31 in the first round. Thus, the latitudinal reinforcing fibers 32a are supplied around the outer peripheral surface of the inner vessel 2, while the meridional reinforcing fibers 31a are continuously and helically wound around the outer periphery thereof, thereby making it possible to continuously supply the latitudinal reinforcing fibers 32a and the meridional reinforcing fibers 31a in a seamless way and alternately laminate each reinforcing fiber layer 31, 32 (refer to FIG. 5). Note that, although approximately four meridional reinforcing fiber layers 31 and approximately four latitudinal reinforcing fiber layers 32 are laminated in this embodiment, the number of laminated layers is not limited by this number and appropriately determined depending on the required strength and acceptable weight.

Now, in the case of the pressure vessel 1 as described above, a fiber orientation ratio of the meridional reinforcing fiber layers 31 and the latitudinal reinforcing fiber layers 32 (density ratio of the reinforcing fibers in each direction) can be freely determined. In other words, a density of the reinforcing fibers 31a in the meridional reinforcing fiber layers 31 and a density of the reinforcing fibers 32a in the latitudinal reinforcing fiber layers 32 can be determined as appropriate for the required strength in each direction. The density of the latitudinal reinforcing fibers 32a can be adjusted by the number of the latitudinal reinforcing fibers 32a supplied from the supply apparatus (not shown). On the other hand, the density of the meridional reinforcing fibers 31a can be adjusted by adjusting a ratio of a rotational speed of the inner vessel 2 about the axis C and a supply speed of the latitudinal reinforcing fibers 32a.

The reinforcing fiber layers 31, 32 thus fixed to the surface of the inner vessel 2 are impregnated with the resin (for example, thermosetting resin or thermoplastic resin described above). Subsequently, the resin is cured by heating (or at room temperature), thereby forming the composite material layer 3. Subsequently, a gas inlet/outlet port (not shown) is formed to complete the pressure vessel 1, the gas inlet/outlet port extending through the inner vessel 2 and the composite material layer 3 so as to make the internal space 4 communicate to an external space.

The present invention is not limited to the above-mentioned embodiment. For example, although the case where the pressure vessel 1 has a circular shape in both cross-sections in the meridional direction and in the latitudinal direction is described in the above-mentioned embodiment, for example, the pressure vessel 1 may be oval or of a shape partially having straight parts in one cross-section or both cross-sections, without limitation. However, in view of an extremely high pressure applied to the pressure vessel 1 by the high-pressure gas stored therein, it is preferred to have the pressure vessel 1 which is circular in both cross-sections in the meridional direction and in the latitudinal direction as the above-mentioned embodiment, to thereby ensure that no stress concentration is formed.

Further, although in the above-mentioned embodiment the reinforcing fiber layers 31, 32 are fixed to the inner vessel 2 before the resin is impregnated into the reinforcing fiber layers and hardened, for example, the reinforcing fibers 31a, 32a to which the resin is applied in advance by dipping or the like are wound around the inner vessel 2 before hardening of the resin, without limitation.

REFERENCE SIGNS LIST 1 pressure vessel
2 inner vessel
3 composite material layer
31 meridional reinforcing fiber layer
31a meridional reinforcing fiber
32 latitudinal reinforcing fiber layer
32a latitudinal reinforcing fiber
4 internal space
40 guide
51 supply apparatus
52 annular rail
C axis
L latitudinal direction
M meridional direction

The invention claimed is:

1. A pressure vessel, comprising:
a toroidal inner vessel formed of an annular-shaped hollow tube;
meridional reinforcing fiber layers formed of reinforcing fibers wound around an outer peripheral surface of the toroidal inner vessel along a meridional direction; and
latitudinal reinforcing fiber layers formed of reinforcing fibers wound around the outer peripheral surface of the toroidal inner vessel along a latitudinal direction,
wherein the latitudinal reinforcing fiber layers are laminated in a plurality of layers around the outer peripheral surface of the toroidal inner vessel, and the reinforcing fibers constituting each of the plurality of layers thus laminated are continuous from one layer to a next layer,
wherein the reinforcing fibers constituting the latitudinal reinforcing fiber layers are arranged over all of the outer peripheral surface of the toroidal inner vessel uniformly in the meridional direction,
wherein the latitudinal reinforcing fiber layers and the meridional reinforcing fiber layers are alternately laminated,
wherein the toroidal inner vessel has a circular shape in both cross-sections in the latitudinal direction and in the meridional direction, and
wherein the reinforcing fibers constituting the latitudinal reinforcing fiber layers are arranged around the outer peripheral surface of the toroidal inner vessel in a state not apart from each other.

2. A pressure vessel, comprising:
a toroidal inner vessel formed of an annular-shaped hollow tube;
meridional reinforcing fiber layers formed of reinforcing fibers wound around an outer peripheral surface of the toroidal inner vessel along a meridional direction; and latitudinal reinforcing fiber layers formed of reinforcing fibers wound around the outer peripheral surface of the toroidal inner vessel along a latitudinal direction,
wherein the latitudinal reinforcing fiber layers are laminated in a plurality of layers around the outer peripheral surface of the toroidal inner vessel, and the reinforcing fibers constituting each of the plurality of layers thus laminated are continuous from one layer to a next layer,
wherein the reinforcing fibers constituting the latitudinal reinforcing fiber layers are arranged over all of the outer peripheral surface of the toroidal inner vessel uniformly in the meridional direction, and
wherein the latitudinal reinforcing fiber layers and the meridional reinforcing fiber layers are alternately laminated.

* * * * *